(No Model.) 2 Sheets—Sheet 2.
J. H. ROUSE.
STUMP EXTRACTOR.
No. 519,821. Patented May 15, 1894.
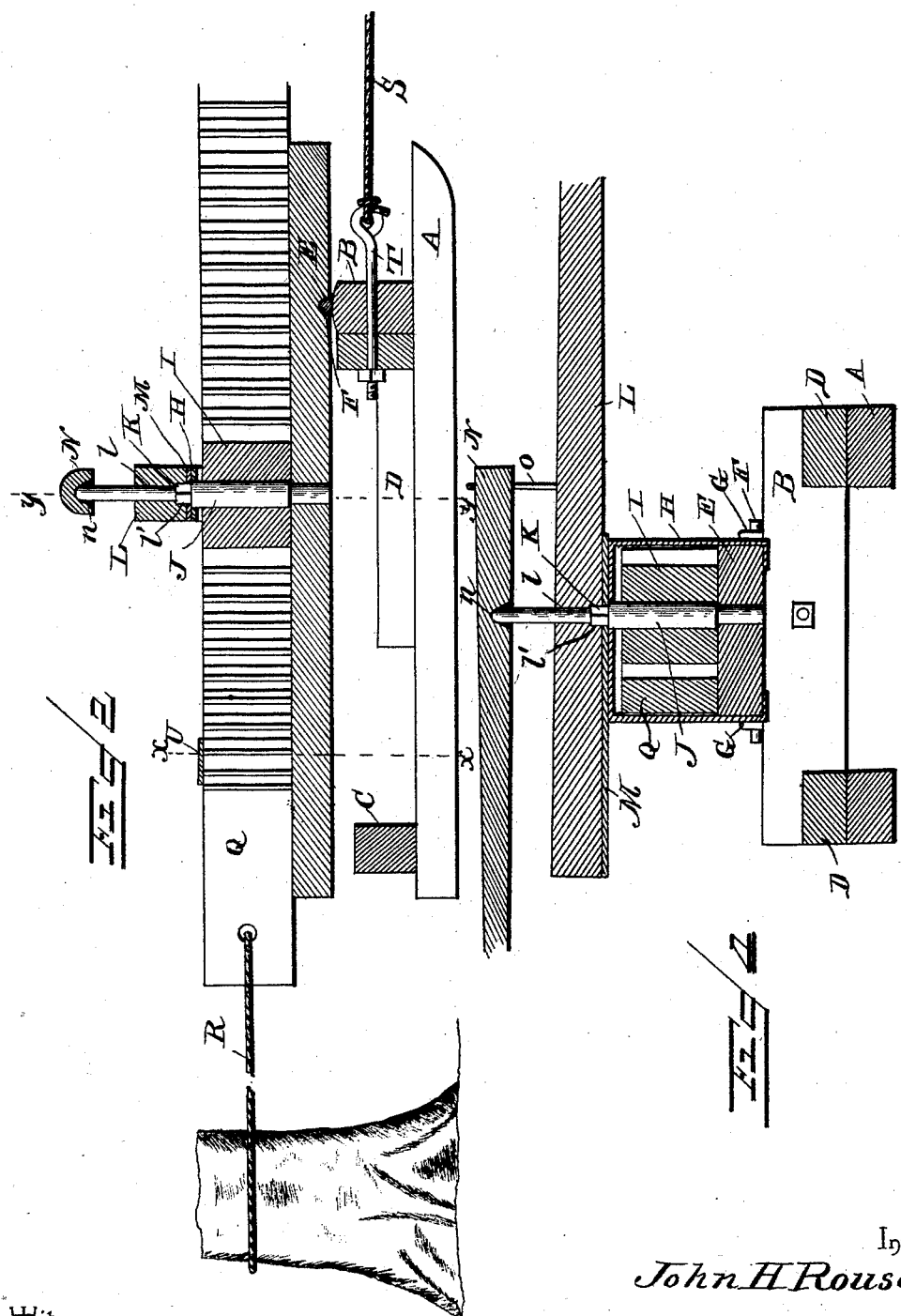
Witnesses
W. E. Schneider
L. P. Wolhaupter
Inventor
John H. Rouse
By his Attorneys.
C. A. Snow & Co.

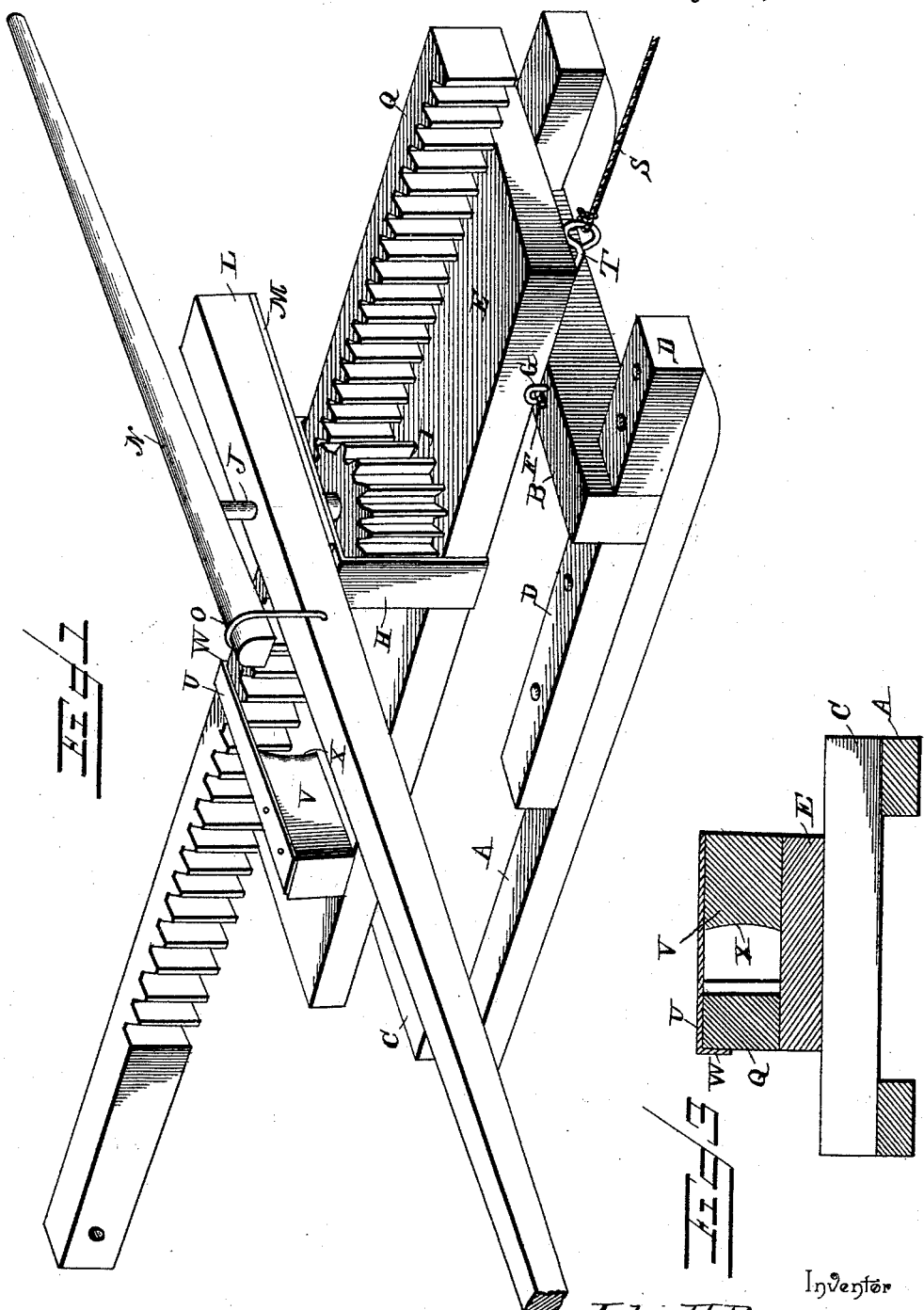

UNITED STATES PATENT OFFICE.

JOHN HENRY ROUSE, OF ADVANCE, MISSOURI, ASSIGNOR OF ONE-HALF TO J. H. SCHONHOFF AND C. A. SCHONHOFF, OF SAME PLACE.

STUMP-EXTRACTOR.

SPECIFICATION forming part of Letters Patent No. 519,821, dated May 15, 1894.

Application filed June 14, 1893. Serial No. 477,596. (No model.)

*To all whom it may concern:*

Be it known that I, JOHN HENRY ROUSE, a citizen of the United States, residing at Advance, in the county of Stoddard and State of Missouri, have invented a new and useful Stump-Extractor, of which the following is a specification.

This invention relates to stump extractors; and it has for its object to provide certain improvements in machines of this character, whereby a strong leverage or pull is secured for easily extracting the stump with but a small expenditure of power.

To this end the main and primary object of the present invention is to provide certain improvements in stump extracting machines whereby the work can be much more easily and efficiently effected.

With these and other objects in view which will readily appear as the nature of the invention is better understood, the same consists in the novel construction, combination and arrangement of parts hereinafter more fully described, illustrated and claimed.

In the accompanying drawings:—Figure 1 is a perspective view of a stump extracting machine constructed in accordance with this invention. Fig. 2 is a central longitudinal sectional view of the machine showing the same connected with a stump to be pulled, and adjusted to the height of such stump. Fig. 3 is a detail transverse sectional view on the line $x$—$x$ of Fig. 2. Fig. 4 is a similar view on the line $y$—$y$ of Fig. 2.

Referring to the accompanying drawings, A represents a sled frame which can be easily moved from place to place, in order to set the machine up convenient to the stump to be extracted, and said sled frame carries at one end the transverse pivot bar B, and at its opposite end the end rest bar C, which is disposed in a plane considerably lower than the opposite pivot bar B. The latter bar is securely braced and held firmly in position on the opposite side beams of the runner frame by the securing strips D, fastened to the side beams or runners on each side of said pivot bar, and such bar forms a pivotal support for the normally higher end of the hinged or pivoted machine platform E.

The platform E, has projecting from opposite sides the extremities of the transverse pivot or hinge rod F. The transverse pivot or hinge rod F, is firmly secured to the under side of the platform E, near one end and engages the hinge eyes G, secured in the end bar B. A pivotal connection is thus provided for the hinged platform E, whereby the same can readily adjust itself to the height of the stump being pulled.

At a point intermediate of the ends of the hinged or pivoted platform E, is arranged the U-shaped bearing bracket H. The U-shaped bearing bracket H, has its opposite side arms secured to opposite sides of said platform, and spans the upper portion thereof, so as to inclose and hold in position on top of the platform the horizontal cog wheel or pinion I. The horizontal cog wheel or pinion I, is mounted on the short vertical power shaft J, projecting above the bracket H, and having a squared portion K, directly above such bracket, and the upper projecting portion of said shaft is adapted to receive the perforated end of the horizontal sweep L. The sweep L, has its perforation $l$, near one end thereof, and such perforation is squared, as at $l'$, at the lower side of the sweep, so as to engage the squared portion of the shaft J, whereby the same can be readily turned as the sweep is carried around by the animal, and such squared end of the perforation $l$, is normally held in engagement with the corresponding portion of the shaft, by means of the weight M, secured to the short end of said sweep lever.

In order to provide means for lifting the sweep lever out of engagement with the squared portion of the pinion shaft, I employ a removable gear lever N. The gear lever N, is provided near one end thereof with the socket $n$, which fits the upper extremity of the shaft J, so as to fulcrum the same thereon and said lever works under the U-shaped lifting loop O, loosely connected at its ends to opposite sides of the sweep L, and projecting above the same. The gear lever N, is thus disposed over the top of the sweep lever, so that by grasping the long end of said gear lever and bearing down on such end, the loop O, will be raised, and will therefore lift the sweep out of engagement with the squared portion of the pinion shaft, thereby allowing the same to revolve backward and allow the extracting chain to slacken up when necessary.

The horizontal cog wheel or pinion I, operated by the means just described, is designed to control the sliding movement of the rack pull bar Q. The rack pull bar Q, is mounted to slide on top of the hinged or pivoted platform E, and slides under and at one side of the bearing bracket H, so that the teeth of the rack bar are engaged by the cog wheel or pinion, whereby the former may be slid in a direction to extract a stump, or allowed to slide in a reverse direction, to slacken up the chain or rope when the operating lever is thrown out of gear with the wheel or pinion shaft as just described.

The rack pull bar Q, has attached to one end thereof the extracting rope or chain R, which is attached to the stump to be pulled in the ordinary manner, and when the machine is in operation the same is suitably anchored to an adjacent stump, or other suitable object, by means of the anchor rope or chain S, one end of which is secured to the eye bolt T, passed through the end bar B.

The sliding pull bar Q, is retained to a working position on the hinged or pivoted platform E, by means of the retaining plate U. The retaining plate U, is attached at one end to the securing block V, mounted on the platform near the free end thereof, and said retaining plate projects beyond the block V, and terminates in a flanged stop end W, which prevents the lateral displacement of the rack bar whereby the teeth would be cramped so as to prevent the machine from operating. The inner edge of the block V, is rounded as at X, so that the teeth of the rack bar may slide freely thereover.

Now from the foregoing it will be apparent that when the machine is attached to a stump by means of the rope or chain R, connected to such stump and the rack pull bar Q, it is simply necessary to carry the sweep around in order to slide the rack bar in a direction which will give a powerful pull on the stump, so as to quickly extract the same. By reason of the hinged or pivotal connection of the platform E, with the sled frame, it will be apparent that the platform and the rack bar thereon will readily adjust themselves in a line with the stump being pulled according to its height.

The advantages of the stump extractor herein described will be readily apparent to those skilled in the art, and I will have it understood that changes in the form, proportion and the minor details of construction may be resorted to without departing from the principle or sacrificing any of the advantages of this invention.

Having thus described the invention, what is claimed, and desired to be secured by Letters Patent, is—

1. In a stump extractor, the combination of a sled frame, a platform loosely connected at one end to said sled frame leaving the other end free for self-adjustment, a sliding rack bar mounted on the platform, and a sweep-controlled cog wheel or pinion also mounted on said platform and adapted to engage the teeth of said rack bar, substantially as set forth.

2. In a stump extractor, the combination of the power shaft journaled vertically in suitable bearings and having a squared portion directly above its upper bearing and at a point intermediate of its ends, a sweep lever having a perforation therein near one end, which perforation is squared at its lower end to engage the squared portion of said shaft on which the lever is mounted for a slight vertical play, a weight attached to the perforated end of the sweep lever to normally hold the same in engagement with the squared portion of the power shaft, a U-shaped lifting loop loosely connected at its extremities to opposite sides of the sweep lever and extending above the same, and a removable gear lever adapted to be removably fulcrumed on the upper extremity of the power shaft and provided near one end with a socket loosely engaging over said upper extremity of the power shaft, the socketed end of the gear lever being adapted to be arranged inside of the U-shaped lifting loop, substantially as set forth.

3. In a stump extractor, the frame, a hinged or pivoted platform mounted on said frame, a rack pull bar, mounted to slide on top of said platform, and a sweep controlled cog wheel or pinion mounted on said platform and meshing with said rack bar, substantially as set forth.

4. In a stump extractor, a sled frame, a platform hinged at one end on top of said frame, a rack pull bar mounted to slide on top of said platform, a bearing bracket attached to said platform, a retaining plate secured to the platform, a rack pull bar mounted to slide on the platform under said bearing bracket and said retaining plate, and a sweep controlled cog wheel or pinion working under said bearing bracket and engaging the teeth of said pull bar, substantially as set forth.

5. In a stump extractor, the sled frame having end bars one of which is higher than the other, a platform hinged at one end to the higher end bar, a U-shaped bearing bracket attached to said platform intermediate of its ends, an adjacent retaining plate arranged over the platform and carried thereby, said retaining plate having a flanged stop end, a rack pull bar mounted to slide on said platform under the bearing brackets and said retaining plate, and a sweep controlled cog wheel or pinion mounted under said bearing bracket and engaging the teeth of said rack bar, substantially as set forth.

In testimony that I claim the foregoing as my own I have hereto affixed my signature in the presence of two witnesses.

JOHN HENRY ROUSE.

Witnesses:
B. F. JONES,
CHRIS. ULRICH.